United States Patent [19]
Helm

[11] Patent Number: 5,835,388
[45] Date of Patent: Nov. 10, 1998

[54] APPARATUS AND METHOD FOR OPTICAL TRANSMISSION OF SERIAL DATA USING A SERIAL COMMUNICATIONS PORT

[75] Inventor: Walter Helm, Farmington, Conn.

[73] Assignee: Timex Corporation, Middlebury, Conn.

[21] Appl. No.: 621,920

[22] Filed: Mar. 26, 1996

[51] Int. Cl.[6] .......................... G06F 15/16; H04B 10/00
[52] U.S. Cl. ..................... 364/705.07; 364/705.01; 359/148; 968/895
[58] Field of Search .................. 364/705.01, 705.07, 364/705.08, 708.1; 359/142, 148; 968/895

[56] References Cited

U.S. PATENT DOCUMENTS

| | | | |
|---|---|---|---|
| 4,130,738 | 12/1978 | Sandstedt | 179/90 B |
| 4,211,065 | 7/1980 | Schmitz et al. | 368/47 |
| 4,418,322 | 11/1983 | Chang | 331/1 A |
| 4,534,012 | 8/1985 | Yokozawa | 364/900 |
| 4,761,763 | 8/1988 | Hicks | 395/286 |
| 4,761,800 | 8/1988 | Lese et al. | 375/370 |
| 4,807,031 | 2/1989 | Broughton et al. | 358/142 |
| 5,008,902 | 4/1991 | Key et al. | 375/225 |
| 5,131,015 | 7/1992 | Benjaram et al. | 375/377 |
| 5,319,545 | 6/1994 | McGarvey et al. | 395/228 |
| 5,488,571 | 1/1996 | Jacobs et al. | 364/705.07 |
| 5,495,358 | 2/1996 | Bartig et al. | 359/189 |
| 5,617,236 | 4/1997 | Wang et al. | 359/172 |
| 5,631,925 | 5/1997 | Koenzen | 375/225 |
| 5,652,602 | 7/1997 | Fishman et al. | 345/156 |

FOREIGN PATENT DOCUMENTS

| | | |
|---|---|---|
| 2 165 129 A | 4/1986 | United Kingdom . |
| 2 244 617 A | 12/1991 | United Kingdom . |

Primary Examiner—Reba I. Elmore
Assistant Examiner—Robert J. Dolan
Attorney, Agent, or Firm—Arthur G. Scheier

[57] ABSTRACT

Accessory for a laptop computer with LCD display which is connected to the laptop serial communications port and optically transmits data to a portable information device, such as a wristwatch designed to receive data as sequential pulses of light. The accessory includes a microcomputer with an RC timebase which is calibrated each time it is used by a special internal program, so that the input baud rate to the accessory matches the communications baud rate of the data received from the laptop. The internal program also permits selection of an output baud rate for the optically transmitted data.

9 Claims, 7 Drawing Sheets

APPARATUS AND METHOD FOR OPTICAL TRANSMISSION OF SERIAL DATA USING A SERIAL COMMUNICATIONS PORT

TECHNICAL FIELD

This invention relates to systems and methods for transferring a binary data stream in a serial edge-based optical transmission format between a computer with a non-scanning type display and a portable information device using a serial communications interface of a laptop computer.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to handheld calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only four to six input buttons. A wearer programs a watch by depressing one or more buttons several times to cycle through various menu options. Once an option is selected, the user depresses another button or buttons to input the desired information. These input techniques can be inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows™ which maintains daily appointment schedules, to-do lists, personal notes, and calendar planning. This information is often a duplicate of that maintained on the portable personal organizer.

Applicant's assignee has recently introduced the Timex® Data Link™ watch. This watch utilizes new technology for transferring information from a personal computer to a portable information device, such as a watch, which is more fully described in U.S. Pat. No. 5,488,571 issued Jan. 30, 1996 and assigned to the present assignee. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is normally used to provide light pulses to the watch. Although it appears to a human viewer that all pixels of a CRT are illuminated simultaneously, the pixels are actually illuminated individually, one at a time, by an electron beam which sequentially scans each row or raster line of pixels beginning with the top raster line and ending with the bottom raster line. It is this characteristic of a CRT and of other line scanning display devices which is utilized to transmit serial data to the Data Link™ watch.

To transfer data to the watch, the watch is held near and facing the CRT. The computer is programmed to display a sequence of display frames in which spaced data transmission raster lines represent individual bits of data. Lines are illuminated or not illuminated, depending on whether they represent binary '0' bits or binary '1' bits. Each line appears as a continuous light pulse of a finite duration to the receiving watch. The watch recognizes an illuminated line as a binary '0' bit. It recognizes a non-illuminated line as a binary '1' bit. Generally, integral numbers of "words" of ten bits are transmitted in a single CRT display frame: eight data bits, a start bit, and a stop bit. As used herein, the term "display frame" means a single screen-size image made up of a matrix of pixels which form a plurality of raster lines. A display frame is generally created by sequentially illuminating or refreshing the raster lines of the display device.

Figure 1:
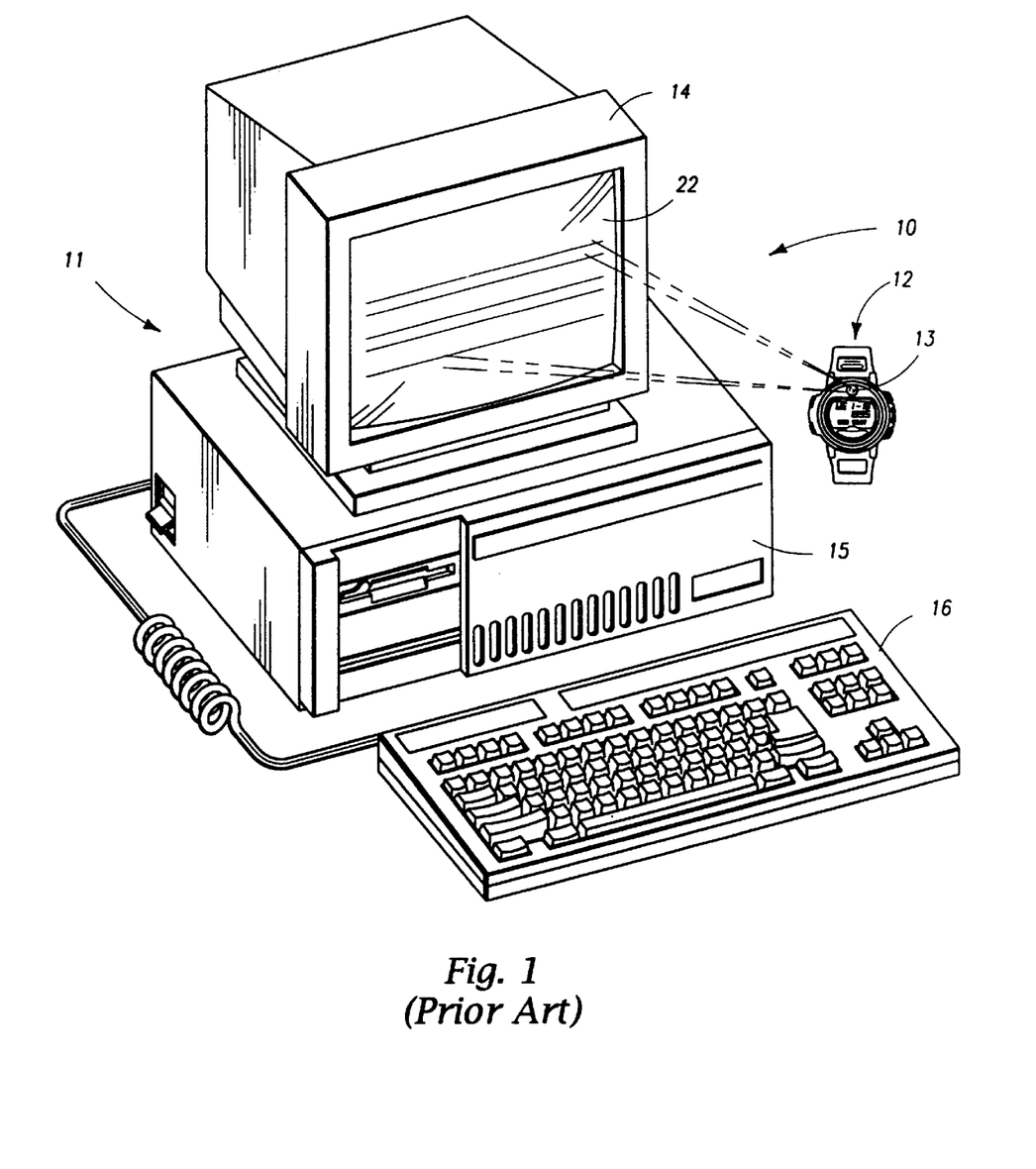
FIGS. 1–6 illustrate a prior art computer system for transmitting data to a watch from a CRT in the form of light pulses, as previously described above.

FIG. 1 shows a system 10 as described above. System 10 includes a computer or computer system 11 and a portable or external information receiving device in the form of programmable Data Link™ watch 12. Computer 11 includes a frame or raster scanning graphics display device 14, a central processing unit (CPU) 15 having a data processor, memory, and I/O components, and a keyboard 16 (or other input device).

Visual display device 14 is preferably a CRT (cathode ray tube) monitor such as commonly used in personal desktop computers. The graphics display device displays sequential display frames containing graphical images on its monitor screen 22. A "display frame" or "frame" means a single, two-dimensional, screen-size image made up of a matrix of pixels. The pixels form a plurality of available raster lines for each display frame.

The individual pixels and raster lines of a CRT are illuminated individually by an electron beam (i.e., the cathode ray) which sequentially scans each raster line beginning with the top raster line and ending with the bottom raster line. The beam is deflected horizontally (in the line direction) and vertically (in the field direction) to scan an area of the screen to produce a single display frame. The electron beam strikes phosphors positioned at the screen of the CRT monitor to cause them to glow. The phosphors are arranged according to a desired pixel pattern, which is customarily a matrix of rows and columns. Conventional color VGA monitors typically have a resolution of 640×480 pixels or better. The process of scanning all raster lines a single time and returning the electron beam from the bottom to the top of the display is referred to as a "frame scan."

The linear scanning electron beam of CRT 14 is utilized to transfer a binary data stream between computer 11 and watch 12. Specifically, computer 11 uses selected, spaced raster lines of CRT 14 for serial bit transmission to watch 12. Application software loaded in CPU 15 generates a sequence of display frames having changing patterns of raster lines that are displayed on CRT 14. The lines appear at watch 12 as edge-based serial data in the form of a series of optical pulses. Watch 12, through optical sensor 13, monitors the illumination of the raster lines of the sequential display frames to reconstruct the transmitted data.

Figure 2:
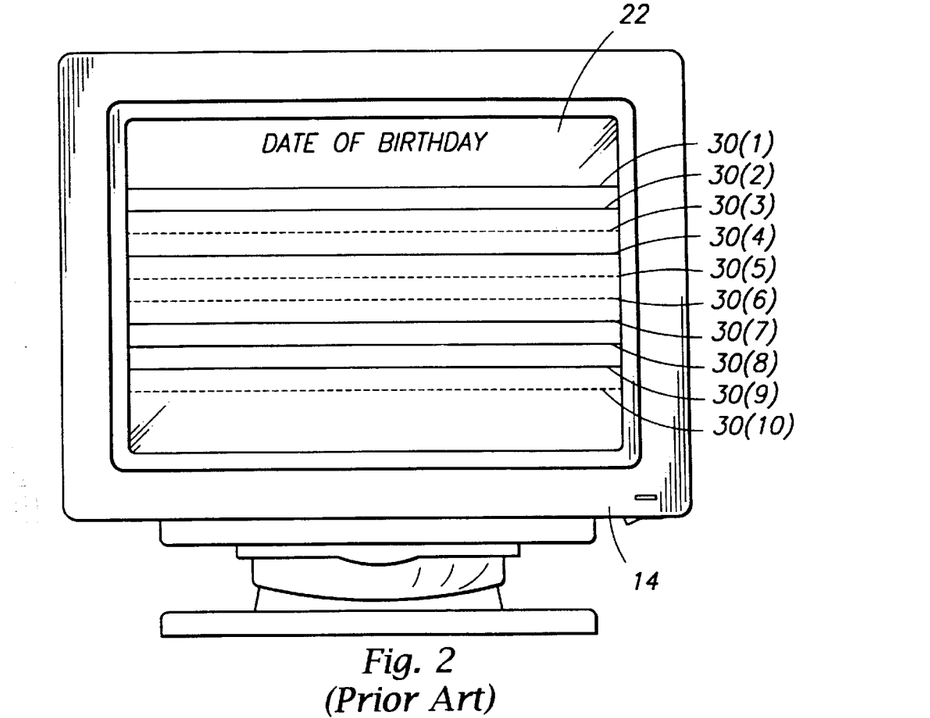

FIG. 2 shows a specific pattern of selected and spaced raster lines used to transmit data to watch 12. Assuming that each frame transmits a single 8-bit byte with start and stop bits, ten raster lines 30(1)–30(10) (out of a much larger total number of available raster lines) are selected for transmitting data. These raster lines will be referred to herein as "data transmission raster lines," as opposed to other, intervening raster lines which will be referred to as "unused raster lines." Solid lines in FIG. 2 represent data transmission raster lines which are illuminated. Dashed raster lines in FIG. 2 represent data transmission raster lines which are not illuminated. Each data transmission raster line position conveys one data bit of information. Bits having a first binary value, such as a value '0', are represented by illuminated data transmission lines (e.g., lines 30(1), 30(2), 30(4), and 30(7)–30(9)) and bits having a second binary value, such as a value '1', are represented by non-illuminated data transmission lines (as illustrated pictorially by the dashed lines 30(3), 30(5), 30(6), and 30(10)). The data transmission raster lines are spaced at selected intervals, with intervening unused or non-selected raster lines, to produce a desired temporal spacing appropriate for the data receiving electronics of watch 12.

For each programming instruction or data to be transmitted to the watch, the software resident in the CPU 15 causes the CRT monitor 14 to selectively illuminate the appropriate data transmission raster lines representing '0' bits by scanning the associated pixels. The selected data transmission lines that represent '1' bits are left non-illuminated. The middle eight lines 30(2)–30(9) represent one byte of programming information being optically transmitted to watch 12. Top line 30(1) represents a start bit and bottom line 30(10) represents a stop bit that are used for timing and error detection. Because of the scanning nature of the cathode ray of CRT monitor 14, these patterns produce a serial light emission from CRT monitor 14 which is representative of a serial bit stream. Each display frame in FIG. 2 represents one byte. A new line grouping is presented for each sequential display frame so that each such display frame represents a different data byte. Two or more bytes could optionally be transmitted in each display frame, as described in U.S. Pat. No. 5,488,571.

Figure 3:
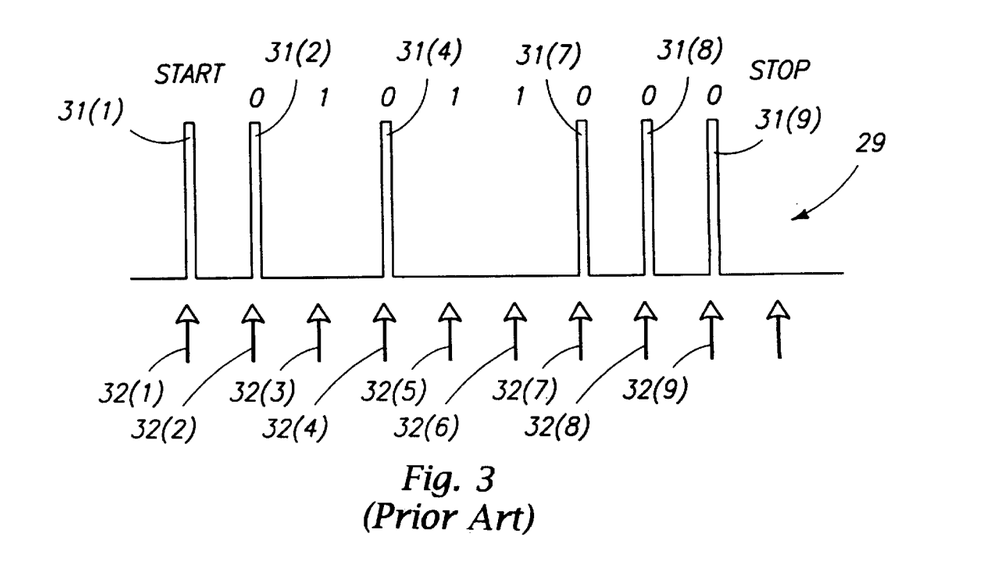

The display of FIG. 2 implements a serial, edge-based, optical transmission format as shown by example signal 29 in the timing diagram of FIG. 3, in which the horizontal direction indicates time and the vertical direction indicates optical signal intensity. Individual bits of the transferred binary data stream have first and second binary values which are represented in this transmission format by the presence or absence of optical signal edges at what are referred to herein as "mark times" 32(1)–32(9). The mark times are specified to occur at a pre-selected bit rate such as 1024 bits/second or 2048 bits/second. They are represented in FIG. 3 by the vertical arrows beneath signal 29. To work with the earliest implementation of the Data Link™ watch, the preselected bit rate should be approximately equal to 2048 bits/second. A second generation Data Link™ watch expects a bit rate of 9600 bits/second.

This type of edge-based signal has the characteristic of returning to a "low" value before every transmitted bit. This type of transmission format is necessitated by the nature of a scanning device such as CRT 14. The longest continuous optical pulse duration which can be generated with CRT 14 is that of a horizontal raster line. This is because the electron beam of the CRT is deactivated between lines. The duration of a single raster line is significantly less than the time between mark times at practical bit rates.

The start bit of a single byte is represented in FIG. 2 by illuminated horizontal raster line 30(1). Illuminated raster line 30(1) produces a light pulse 31(1) as shown in FIG. 3 of a relatively short duration. The rising edge of light pulse 31(1) occurs at a first mark time 32(1). The first bit of the transmitted byte is a "0", and is represented in FIG. 2 by illuminated horizontal raster line 30(2). Illuminated raster line 30(2) produces a light pulse 31(2) (FIG. 3). The rising edge of light pulse 31(2) occurs at a second mark time 32(2). The second bit of the transmitted byte is a "1", and is represented in FIG. 2 by non-illuminated horizontal raster line 30(3). Non-illuminated raster line 30(3) produces no light pulse and no rising edge at the third mark time 32(3). The third bit of the transmitted byte is a "0", and is represented in FIG. 2 by illuminated horizontal raster line 30(4). Illuminated raster line 30(4) produces a light pulse 31(4). The rising edge of light pulse 31(4) occurs at a fourth mark time 32(4). The remaining bits of the byte are transmitted in a similar manner, followed by a stop bit which is represented by non-illuminated raster line 30(1).

Figure 4:
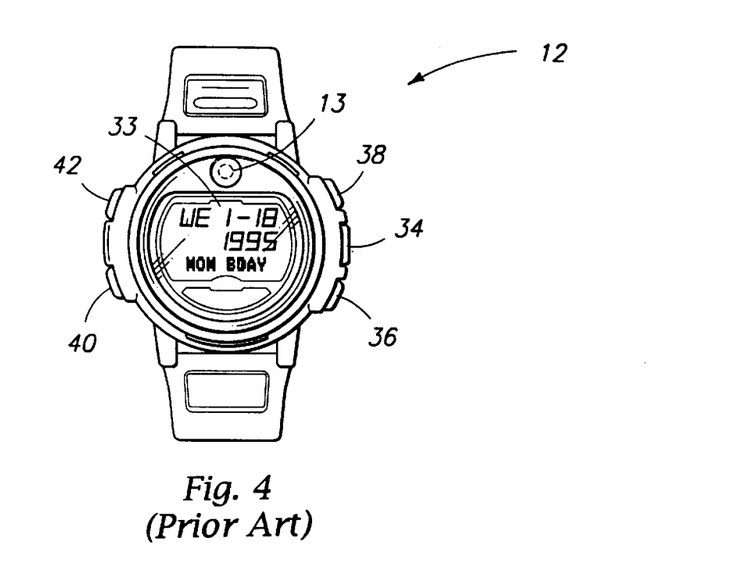

FIG. 4 shows an external face of programmable watch 12, which is illustrated for discussion purposes as the Timex® Data Link™ watch. Other watch constructions as well as other portable information devices can be used in the context of this invention. Watch 12 includes a small display 33 (such as an LCD), a mode select button 34, a set/delete button 36, next/previous programming buttons 38 and 40, and a display light button 42. Optical sensor 13 is positioned adjacent to display 32. In the programming mode, display 32 indicates the programming option, and what data is being entered therein. During the normal operational mode, display 32 shows time of day, day of week, or any other function common to watches.

Figure 5:
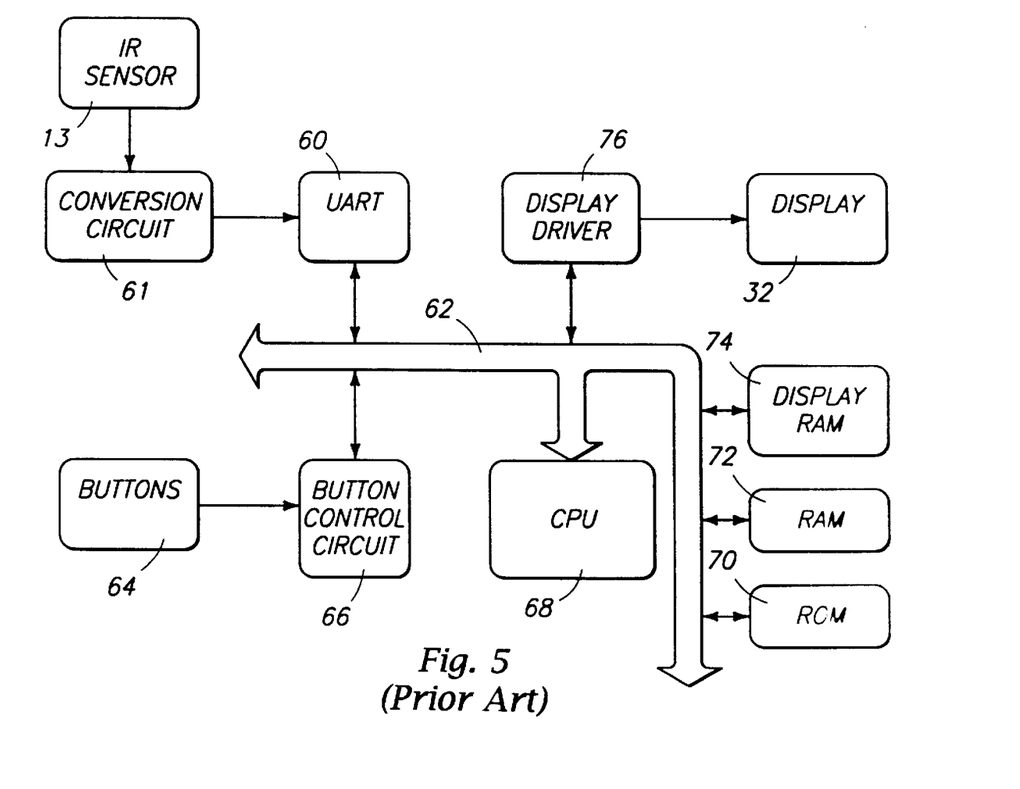

Referring now to FIG. 5, watch 12 includes a CPU (Central Processing Unit) 68 for performing data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM 74 is provided to temporarily store data used by display driver 76 to depict visual information on display 32. These components can be incorporated into a single microprocessor-based integrated circuit. One appropriate microprocessor IC is available from Motorola Corporation as model MC68HC05HG.

Watch 12 has an optical sensor 13 which is coupled to a digital serial receiver or UART 60. UART 60 is a conventional, off-the-shelf circuit which receives data in eight-bit words surrounded by start and stop bits. However, UART 60 must receive a conventional NRZ (non-return to zero) or level-based signal—in contrast to the edge-based signal illustrated in FIG. 3. Therefore, watch 12 includes a filter and conversion circuit 61 to produce a level-based or NRZ serial signal from the edge-based signal generated by computer 11 and CRT 14. Such conversion circuit may include a retriggerable monostable oscillator.

Figure 6:
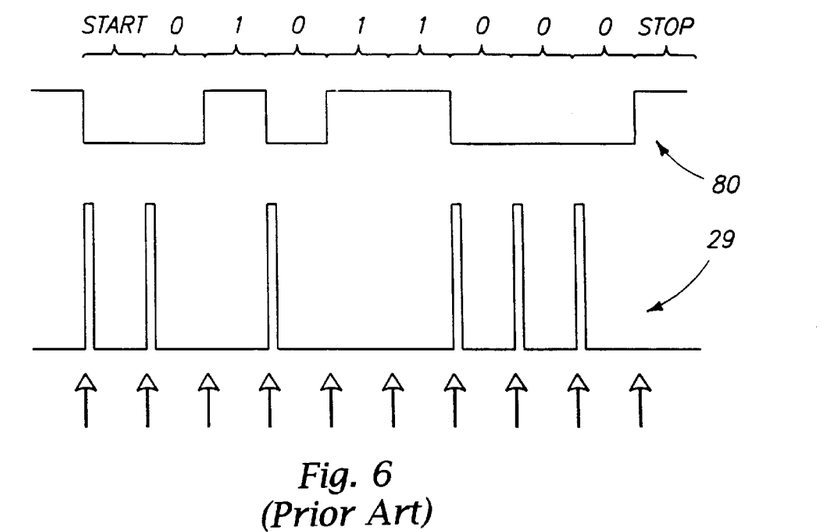

FIG. 6 shows a level-based signal 80 after conversion inside the watch by filter and conversion circuit 61. For reference, the edge-based signal 29 of FIG. 3 is shown below level-based signal 80. The initial start bit pulse 31(1) of FIG. 3 is inverted and extended by conversion circuitry 61 until the next mark time. The remaining data bits and stop bit are similarly extended so that signal 80 only changes level when a bit has a different value than the previous bit. This is in contrast to signal 29 of FIG. 3, where the signal always returns to a "low" value before the next bit.

The output of filter and conversion circuit 61 is fed to UART 60. UART 60 is coupled to an internal bus 62, which is preferably an eight-bit bus. Inputs received from the control buttons on the watch, referenced generally by box 64, are detected and deciphered by button control circuit 66 and placed on bus 62.

To transmit data to the watch, the computer 11 is first loaded with a compatible time management software and optical pattern generating software. One example time management software is Microsoft's® Schedule+™ for Windows™ and a suitable optical pattern generating software is Timex® Data Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 13 in juxtaposition with monitor screen 22. A sequence of changing optical patterns having horizontal contiguously-scanned lines begin to flash across the monitor screen as shown in FIG. 3 to optically transmit data regarding the various appointments and tasks. In about 20 seconds, the system will have transmitted as many as 70 entries, including the birthday reminder. These entries are kept in data RAM 72.

The system described above is extremely convenient and easy to use. However, it does have a significant drawback in that it cannot be used with some types of computer displays. Specifically, LCD screens and other non-scanning displays do not generate light pulses which can be sensed by the optical sensor of the Data Link™ watch. Accordingly, another method must be used to program the watch from laptop computers which use non-scanning displays.

It has been suggested in the prior art that communications from a computer to a watch could be accomplished with LED's (light emitting diodes). One such scheme is exemplified in U.S. Pat. No. 4,534,012 issued Aug. 6, 1985 to Yokozawa. Another scheme is shown in U.S. Pat. No. 4,211,065 issued Jul. 8, 1980 to Schmitz et al. The aforesaid patents require dedicated interface structures to be built into the computer, which detract from their general functionality for general purpose usage. On the other hand, most computers are equipped with an internal UART and programmable serial communication ports, along with associated software to establish serial data transmission using the established communications protocols and interface conventions such as RS-232C, at a fixed communications baud rate.

When using a serial communications port to transmit signals by an LED, an optical data converter is required, which will receive successive data signals at a fixed communications baud rate from the computer and optically retransmit the received data characters as a serial bit stream of edge based signals in the form of light pulses. The optical data converter must be able to receive data at one rate and transmit it at a rate suitable for the watch, which has a limited baud reception rate and limited memory. Also, if the converter uses a microcontroller, the cost will be reduced by using RC circuit components to control the frequency rather than more expensive quartz crystal or ceramic resonators as the time base. However, RC oscillators are not precise in frequency, which varies with temperature, and must be calibrated.

Accordingly, it is an object of the present invention to provide an improved apparatus and method for optical transmission of serial data using a serial communications port.

Another object of the invention is to provide an improved optical data converter as an interface between a laptop computer with a non-scanning display and a watch of the type which is especially adapted to receive data from a CRT display in the form of edge-based serial light pulses.

Still another object is to provide conversion circuitry for converting data signals from a serial communications port of a computer to serial light pulses for reception by a portable information device.

Another object of the invention is to provide an optical data converter which is adapted to match its input baud rate with the fixed communications baud rate of the computer serial communications port.

Another object of the invention is to provide a less expensive optical data converter, which can use a microcontroller having an RC oscillator as a time base.

DRAWINGS

The invention will be better understood by reference to the following description, taken in connection with the accompanying drawings, in which.

SUMMARY OF THE INVENTION

Briefly stated the invention comprises an apparatus and method for receiving successive data characters as level based signals at a fixed communications baud rate from a serial communications interface port of a computer and optically retransmitting the received data characters as a serial bit stream of edge based signals at a selectable output baud rate, the apparatus comprising converter circuitry including a programmable microcomputer having an oscillator and adapted to convert level based signals received at an input baud rate to edge based signals, means for connecting an input of the converter circuitry with a serial communications interface port of a computer, a light emitting element operably connected to an output of the converter circuitry to emit a serial bit stream of light pulses, and a program in the microcomputer for matching the input baud rate to the fixed communications baud rate and for computing a selected output baud rate. In its preferred form the apparatus program includes a first program portion in the microcomputer responsive to an initial baud rate setting character and adapted to calibrate the oscillator so that the input baud rate substantially matches the fixed communications baud rate, and a second program portion in the microcomputer adapted to compute an output baud rate of the serial bit stream of light pulses as a selectable function of the input baud rate. The character transmission rate is controlled by echoing back each character to the computer and comparing it to the transmitted character.

DESCRIPTION OF THE PREFERRED EMBODIMENT

Figure 7:
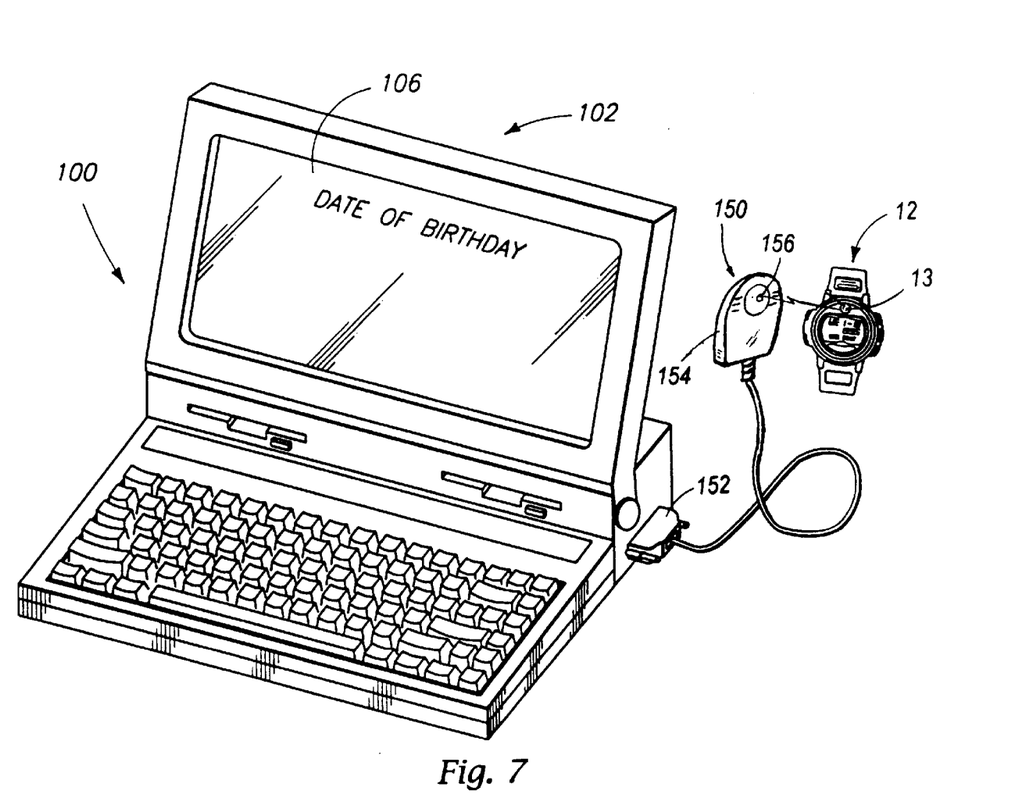
FIG. 7 is a schematic drawing of a laptop computer transmitting data to a watch from an optical data converter in accordance with the present invention.

FIG. 7 shows a system 100 in accordance with the preferred embodiment of the present invention for transferring data between computer 102 and watch 12. Note that the watch 12 in FIG. 7 is the same as that shown in FIGS. 2 and 6; therefore, no further discussion of the watch 12 will be required. The illustrated system 100 is an IBM®-compatible system, although other architectures, such as an Apple®-compatible system, may also be employed.

Figure 8:
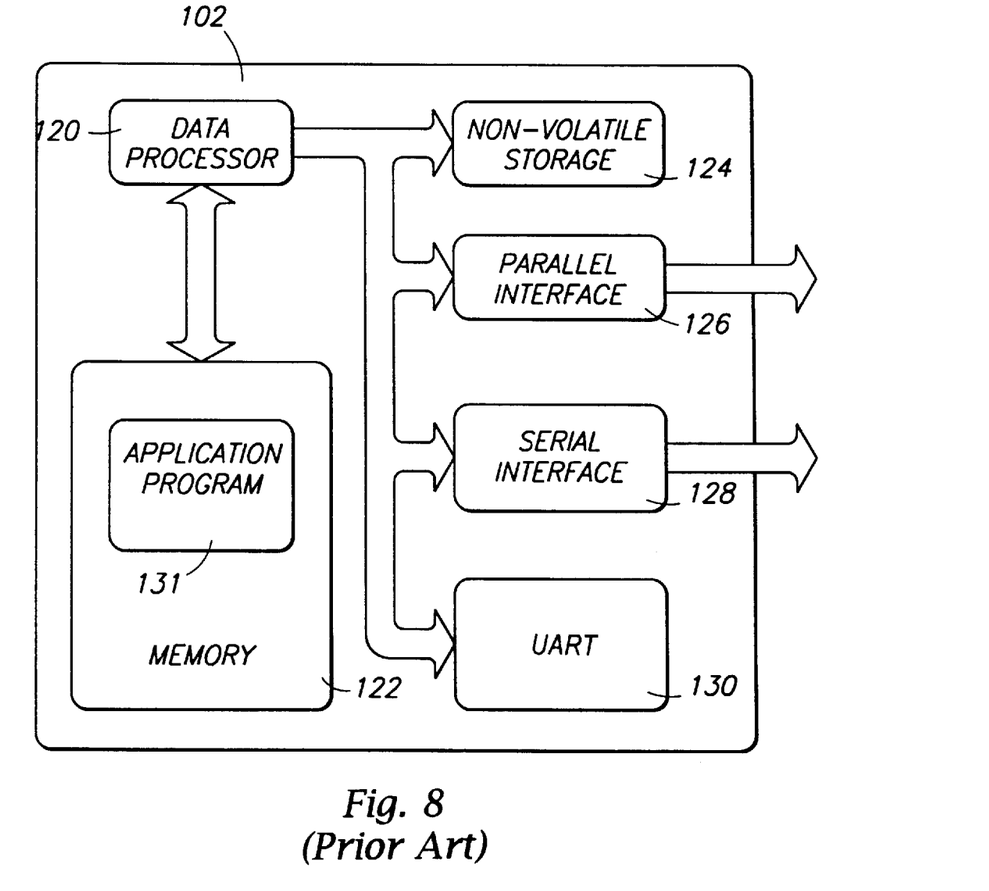
FIG. 8 is a simplified block diagram of the laptop computer.

Computer 102 is a laptop computer having an LCD or other non-scanning type display 106 which is unsuitable for transmission of data to the watch 12 via a CRT scanning system described above for FIGS. 1, 3–5. FIG. 8 is a simplified schematic diagram, which illustrates conventional internal components of the computer 102, including a data processor 120, volatile program memory 122, non-volatile storage memory 124, parallel interface 126 and serial interface 128. Computer 102 further includes a UART (universal asynchronous receiver/transmitter) 130, which is used to process signals received and sent over serial interface 128.

The serial interface 128 conforms to the RS-232C standard in the preferred embodiment, and includes a communications port associated with an external serial port connector (not shown in FIG. 8) adapted for connection to external devices, such as communication devices or serial printers. For the IBM®-compatible system illustrated, industry-standard "DB-25" connectors can be used for the serial communication port, but nine-pin (DB-9) connectors are more common and are preferred for laptop computers. Serial interface 128 has serial transmission and reception lines, referred to respectively as TxD and RxD lines, as well as DTR (data terminal ready) and GND (ground) line. Other control lines may be included. The TxD and RxD lines cannot be modified by the computer 102. Rather, they are under the control of the universal asynchronous receiver/transmitter (UART 130) which normally processes bits of data at a specified bit rate. The control lines, however, can be monitored and modified at any time by accessing one or more control registers.

Referring back to FIG. 7 the system 100 includes an optical signal converter 150 adapted for connection to the serial interface 128 of the computer 102. The optical signal converter 150 has a detachable connector 152, wired to connect with the serial interface 128 connectors of the computer 102. The converter 150 comprises a casing 154, a light emitting element 156 disposed in the casing 154, and a flexible cable attached between converter 150 and connector 152. In the preferred embodiment of the present invention, the light emitting element 156 is a light emitting diode (LED).

In using the system 100 to transfer data between the computer 102 and the watch 12, a user initially configures the computer 102 for data transfer in a manner similar to that for the above-described U.S. Pat. No. 5,488,571. As with the system described in the aforementioned U.S. Pat. No. 5,488,571, the computer 102, when transferring data, runs an application program 131 (see FIG. 8) to control the data transfer. Likewise, the user also configures the watch 12 for data receipt. Data receipt is controlled by the ROM 104 of the watch 12, as described in the aforementioned U.S. Pat. No. 5,488,571.

Figure 9:
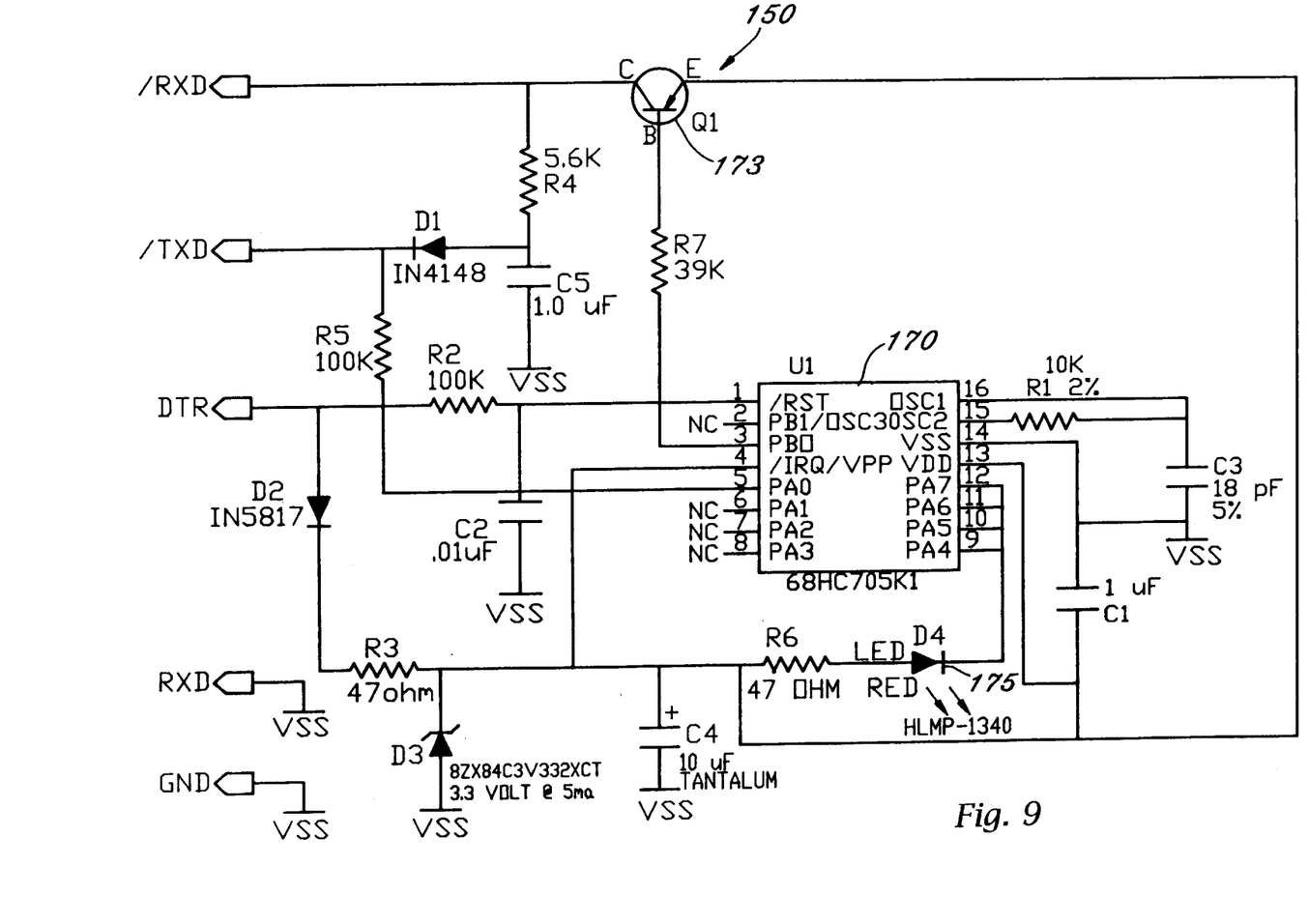
FIG. 9 is a diagram of the conversion circuitry in the optical data converter, and, FIG. 10 is a flow chart illustrating portions of the program used in the optical data converter.

A preferred embodiment of the optical signal converter 150 for transferring data between computer 102 and watch 12 will be discussed with respect to the circuit diagram of FIG. 9. The circuit diagram shows the converter 150 comprising a microcontroller 170, which is preferably model M68HC05K1 (abbreviated herein as 6805K1) or the like from Motorola Corporation. Complete details of the operation of the 6805K1 microcontroller 170 are available from Motorola Corporation.

The 6805K1 microcontroller 170 has 16 pins. Only those relevant to the invention will be discussed. Pin 1 (/RST) is coupled to the data terminal ready (DTR) control output line of the serial interface 128. Pin 1 is active low and can be toggled by the computer 102 setting DTR low, then high. Pin 3 (PB0) is an output connected to control a pnp transistor 173 and send ASCII characters with start and stop bits in NRZ format to the RxD line of the computer 102. This line is used to echo (re-transmit) characters transmitted to watch 12.

Pin 5 (PA0) is connected to the TxD line of computer 102. It can be programmed to generate an interrupt on the positive edge to detect the leading edge of the start bit to assist in timing an initial or "baud rate setting character" _"x", as will be described.

Pins 9–12 (PA4–PA7) are normally high outputs used to generate pulses to drive an LED, indicated by reference numeral 175. These pins are all connected together to maximize the LED output. The LED corresponds to light emitting element 156 shown in FIG. 7.

Pin 13 $V_{dd}$ is connected to the supply voltage (nominally 3.4 volts). This voltage is obtained from the DTR line at the serial port of computer 102. The computer application program 131 must set this line high to power up the circuitry of the optical signal converter 150. Pin 14 or $V_{SS}$ is the power return and signal return, which is connected to the serial interface 128 GND terminal of the computer 102.

Lastly, pin 15 (OSC2) and pin 16 (OSC1) are connected to circuit elements of an RC circuit. The design uses the two-pin RC oscillator mode of operation as described in the Motorola documentation, and since it does not require a quartz crystal, is less expensive. The oscillator frequency is 2 MHz±20%, which is not accurate enough to use as a time base directly. However, in accordance with the invention, the frequency is selectable and is calibrated by programming the 6805K1 microcontroller, as will be described, so as to match the input baud rate of the microcontroller to the fixed communications baud rate of the signal from computer 102.

BAUD RATE DETERMINATION

The optical signal converter 150 is designed to receive a signal sent from the computer 102 at a fixed communications baud rate and to transmit to watch 12 a selectable output baud rate. The input baud rate of converter 150 is intended to match the fixed communications (9600) baud rate and to retransmit at an output baud rate of either 9600 (high speed mode) or 2048 baud.

The 6805K1 microcomputer of the converter 150 uses an RC oscillator instead of a crystal or ceramic resonator for its time base for cost reasons. The combined tolerances of the R and C and the 6805K1 result in an overall frequency uncertainty of ±20%. This uncertainty is too large for use as a baud rate generator for receiving asynchronous characters from the computer 102.

The optical signal converter 150 is only used for short durations at a relatively constant temperature. A calibration of the RC time base would be valid for the duration of the Timex® Data Link™ data transfer. The method used for calibration involves using the first character sent from the computer 102 as a frequency determining means by the 6805K1 program. This character is termed the "baud rate setting character".

The 6805K1 provides an 8 bit hardware counter (TCR) that is clocked by the oscillator frequency divided by eight. The 6805K1 oscillator is set to run at a nominal 2 MHz. This frequency was chosen to be as high as possible while keeping the overall power requirements of the converter 150 within the capabilities of any PC serial port. One bit time (in clock cycles) of 9600 baud at 2 MHz is 208 cycles. Since the counter input is prescaled by 8, the count value for one bit time would be 26 with one count of uncertainty.

A time interval measurement of 8 bit times was chosen for reasons of resolution and program efficiency. The 8 bit time count value of about 200 provides better than 1% resolution for the time measurement, which is more than sufficient for received bit timing. Since 8 is a power of two, the number of cycles per bit can be easily calculated by bit shifting.

For maximum precision, the count should be taken between two identical signal edges. The ASCII code for lower case "x" is 01111000. An idle serial port outputs a steady "1" value. Note that a serial port transmits the least significant bit (LSB) first and that the data bits are always preceded by a "0" start bit.

Calibration is carried out by a program included in the ROM of microcontroller 170. After power up initialization the program waits for the start bit transition to occur. When it does it copies the contents of the TCR (the count) to a memory location. The program then waits for the next 1 to 0 transition that happens when bit 8 of the "x" is transmitted. The TCR count is again examined and the previously copied count is subtracted to obtain a delta count (Cd). This delta count is the count for eight bit periods.

Note that any ASCII character that has a 1 to 0 transition at bit 8 with none between the start bit and bit 8 could serve the same purpose as a baud rate setting character. Examples include 01000000 (ascii @) and 01111110 (ascii ~). Further, with additional programming, multiple transitions between the start and end transition could be accounted for.

The program uses the delta count (Cd) to create a table with ten entries for the start bit, eight data bits, and the stop bit. The entries are the calculated count values defining the middle of each bit starting from the beginning of the start bit. These table values allow rapid calculation of the TCR value at which the input should be sampled to determine each bit value of the received character. In this manner an input baud rate of 9600 is accurately determined. The same table is used to calculate the TCR values for shifting the bits back out to the computer 102 or echoing the received signal at the same rate it was received.

A second program in the microcontroller 170 serves to select an output baud rate of the edge based signal sent to the watch 12. An output baud rate translation from 9600 to 2048 is accomplished by computing the count value for one bit time at 2048 by multiplying by the ratio 9600/2048. Any other desired output baud rate may be obtained by changing this ratio, or the ratio may be set at "1" for an output baud rate of 9600.

Figure 10:
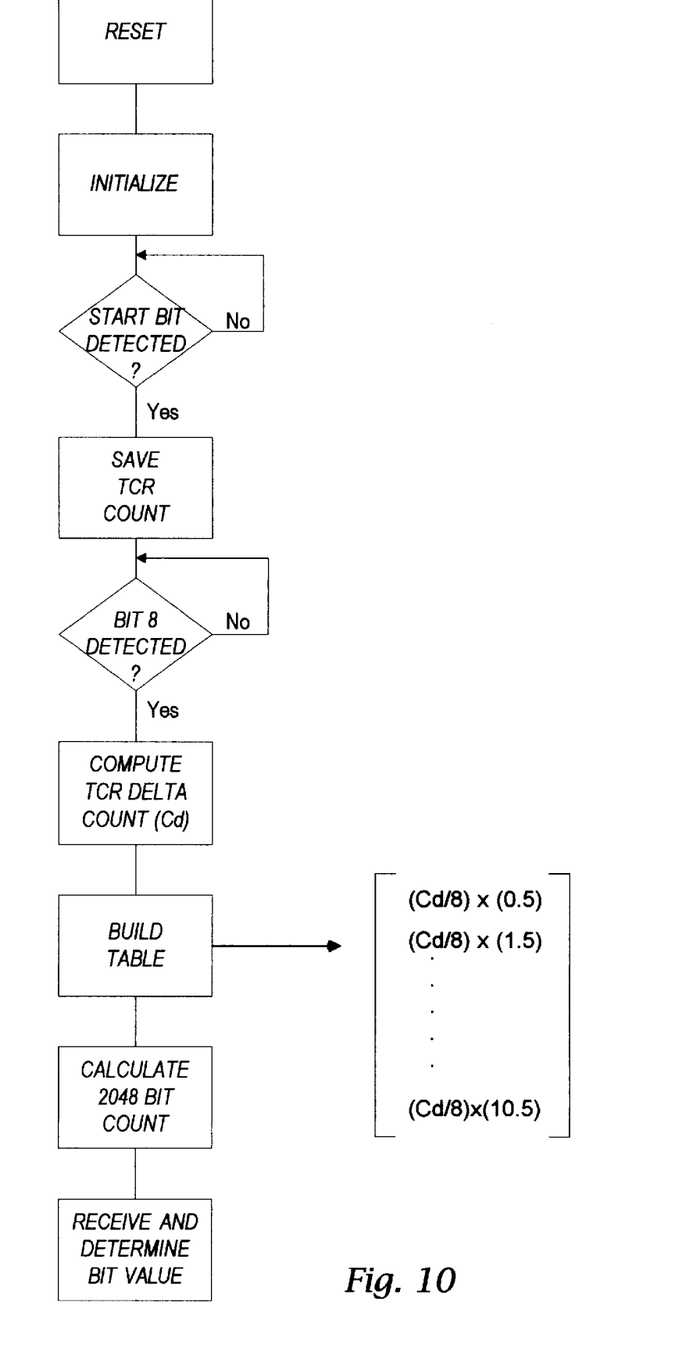

The foregoing baud rate determination program is illustrated in the flow chart of FIG. 10, which should be self explanatory in light of the discussion above.

OPERATION

The watch 12 is designed to receive optical pulses similar to sequential selected raster lines on a CRT, as described in connection with FIGS. 1–6. Since the computer 102 does not have a CRT or scanning-type display, the application program 131 is arranged to process data through the UART 130 to transmit data to the serial interface 128, and is also programmed to provide the necessary controls to the conversion circuitry of the present invention. The optical signal converter 150 is arranged to receive serial data in NRZ format at the connector 152 attached to computer 102, and to convert it to edge-based serial data in the form of light pulses supplied by the optical light emitting element 156 as pulses of light in substantially the same format as though it were transmitted by a CRT system.

Details of the operation are as follows. The communications port settings of computer 102 are set at 9600 baud, eight data bits, no parity and one stop bit. After power up initialization, the converter 150 monitors the comm port TxD signal for the occurrence of a start bit. The first character the computer 102 sends to the converter 150 is the "baud rate setting character", which is used to determine a timing parameter to establish the baud rate and calibrate the oscillator. This is necessary because the RC oscillator of the microcontroller 170 is not accurate enough to use as a time base directly.

The converter monitors the TxD signal, reads in the data bits of each character and retransmits the character formatted as pulses suitable for the watch 12. In the case of an early version of the Timex® Data Link™, these pulses are transmitted via the LED 175 (light emitting element 156) at 2048 baud. Later versions of the Timex® Data Link™ are set for 9600 baud. Character transfer rate is controlled by the software of the computer 102.

Each transfer of data to converter 150 begins by toggling the DTR line for at least 100 microseconds. The first or baud rate character sent to the converter is an ASCII "x" (01111000). This character is used to establish the timing parameters necessary for baud rate generation in the converter 150. Other control characters may be used as well. A "U" (01010101) commands the converter 150 to select an output baud rate to 2048.

Each character sent to the converter 150 is echoed (retransmitted) to the computer 102 after the character is sent to the watch 12. This makes it possible for the computer 102 to establish transmit character transfer rate by monitoring the echo. If the echoed character does not match the transmitted character, the converter 150 should be reset and re-initialized.

While there is described what is considered to be the preferred embodiment of the invention, other modifications will occur to those skilled in the art, and it is desired to secure in the appended claims all such modifications as fall within the true spirit and scope of the invention.

I claim:

1. Apparatus for receiving successive data characters as level based signals at a fixed communications baud rate from a serial communications interface port of a computer and optically retransmitting each of the received data characters as a serial bit stream of edge based signals at a selectable output baud rate, the apparatus comprising:

converter circuitry including a programmable microcomputer having an oscillator and adapted to convert level based signals received at an input baud rate to edge based signals, means for connecting an input of the converter circuitry with a serial communications interface port of a computer, a light emitting element operably connected to an output of the converter circuitry to emit each of said characters as a serial bit stream of light pulses, and program means in the microcomputer for adjusting the input baud rate to match the fixed communications baud rate and for computing a count value for one bit time required to obtain a selected output baud rate for optically retransmitting each of said received data characters.

2. The apparatus according to claim 1, wherein the microcomputer is further programmed to echo each received data character back to said computer in order to provide for control of character transfer rate.

3. The apparatus according to claim 1, wherein said program means includes:

a first program in the microcomputer responsive to an initial baud rate setting character and adapted to calibrate the oscillator so that the input baud rate substantially matches the fixed communications baud rate.

4. The apparatus according to claim 3, wherein said first program is arranged to count time between signal level transitions in the baud rate setting character and to construct a table for sampling received data characters.

5. The apparatus according to claim 1 wherein said program means includes:

a second program in the microcomputer adapted to compute an output baud rate of the serial bit stream of light pulses as a selectable function of the input baud rate.

6. The apparatus according to claim 5, wherein said second program is arranged to compute the computed count value for one bit time required for a selected output baud rate by multiplying the count value for one bit time at the fixed communications baud rate by a ratio having the fixed communication baud rate as the numerator and the selected output baud rate as the denominator.

7. The method for receiving successive data characters as level based signals at a fixed communications baud rate from a serial communications interface port of a computer and optically retransmitting each of the received data characters as a serial bit stream of edge based signals at a selectable output baud rate, the method:

providing converter circuitry including a programmable microcomputer having an oscillator and adapted to convert level based signals received at an input baud rate to edge based signals, connecting an input of the converter circuitry with a serial communications interface port of a computer, connecting a light emitting element to an output of the converter circuitry to emit each of said characters as a serial bit stream of light pulses, and programming the microcomputer to adjust the input baud rate to match the fixed communications baud rate and to compute a count value for one bit time required to obtain a selected output baud rate for optically retransmitting each of said received data characters.

8. The method according to claim 7, wherein said programming step includes:

programming the microcomputer to be responsive to an initial baud rate setting character and calibrating the oscillator so that the input baud rate substantially matches the fixed communications baud rate.

9. The method according to claim 7, wherein said programming step includes:

programming the microcomputer to compute an output baud rate of the serial bit stream of light pulses as a selectable function of the input baud rate.

* * * * *